Figure 1:
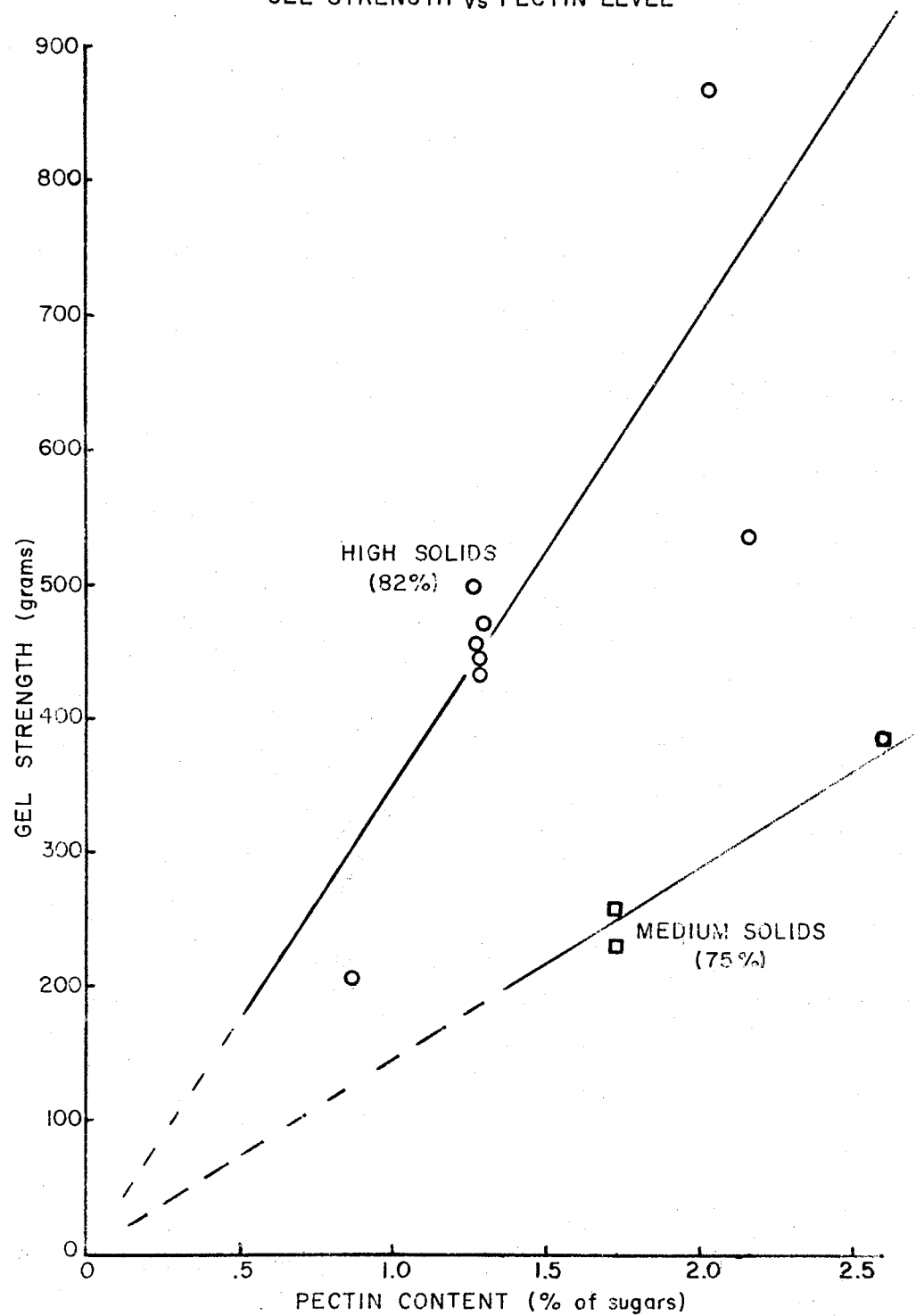

000
United States Patent [19]

Tiemstra

[11] 4,241,099

[45] Dec. 23, 1980

[54] PECTIN FORMULATIONS, PRODUCTS AND METHODS HAVING DELAYED-ACTION ACIDULANTS

[76] Inventor: Peter J. Tiemstra, 6543 Pontiac Dr., LaGrange, Ill. 60525

[21] Appl. No.: 15,287

[22] Filed: Feb. 26, 1979

[51] Int. Cl.$^3$ ............................................. A23L 1/06
[52] U.S. Cl. ................................... 426/577; 426/512; 426/517
[58] Field of Search ............... 426/573, 577, 658, 660, 426/512, 515

[56] References Cited

U.S. PATENT DOCUMENTS

| | | | |
|---|---|---|---|
| 2,015,857 | 10/1935 | Leo ........................................ | 426/577 |
| 2,380,739 | 7/1945 | Evans et al. ........................... | 426/577 |
| 2,441,729 | 5/1948 | Steiner .................................. | 426/577 |
| 3,185,576 | 5/1965 | Ross ...................................... | 426/577 |

OTHER PUBLICATIONS

Gallagher, L. C., "Pectin Confectionary Jellies," Sunkist Growers, Ontario, Calif.
"Food Acidulants" Chem. Div. of Pfizer Inc., Tech. Information Bulletin 1977.

*Primary Examiner*—Jeanette M. Hunter
*Attorney, Agent, or Firm*—Lockwood, Dewey, Alex & Cummings

[57] ABSTRACT

Pectin containing gelled products are provided such that their gelling is delayed for an enhanced length of time, adequate to permit the deposition or filling of the formulation into molds or containers before gelling proceeds. The products and method by which they are prepared more efficiently use pectin in a delayed gelation process by allowing setting at the optimum gelling pH in order to prepare final products of a desired gel strength with minimal quantities of pectin. A delayed-action or time-release acidulant is used in the method and is incorporated into the formulations and products of this invention, such acidulants including anhydrides, esters, lactones, and combinations thereof.

16 Claims, 8 Drawing Figures pH REDUCTION OF GDL SYSTEMS pH REDUCTION of TIME RELEASE ACIDULANTS

PECTIN FORMULATIONS, PRODUCTS AND METHODS HAVING DELAYED-ACTION ACIDULANTS

BACKGROUND OF THE INVENTION

The present invention generally relates to gelling formulations and their use in preparing gelled products. More particularly, this invention is directed to formulations including delayed-action acidulants that provide improved open time attributes to the formulation whereby the formulation can be deposited in a pre-gelled state and subsequently gelled within a selected mold or container in order to prepare gelled products in a manner more suitable for use within mechanized filling operations which can take advantage of a delay between the time that the pre-gelled formulation is prepared and the time that the formulation begins to gel to a significant degree. Formulations making use of such delayed-action acidulants are also capable of preparing final products having desired gel strengths with optimum usage of pectin.

Within the pectin gel food industry, it is well known that pectin gel formulations should include a source of solids, typically sugars or the like, a gel forming agent, usually pectin, and agents for controlling the pH of the formulation, typically a food grade acid in combination with a buffering agent, all within a aqueous system, which often can be characterized as a syrup. It is generally understood that the sugar solids and the acid combine to modify the pectin such that the modified pectin causes the aqueous system to gel, it being generally accepted that sugar is involved in the gelling mechanism by hydrogen bonding with the pectin, that water which is the medium in which the other ingredients are dissolved or suspended is also involved in the gelling mechanism, and that the gelling mechanism is triggered by the pH of the formulation.

There are general interrelationships among these ingredients in the formulations; for example, when a formulation includes a relatively high solids content, gel setting will occur with relatively less pectin or with relatively less acid, and formulations containing relatively high pectin levels will gel set when such formulations contain relatively low quantities of solids or acid.

Materials known as pectins are methoxylated esters of polyglacturonic acid and are hydrophilic colloids that hydrate slowly, although they dissolve in aqueous systems when mixed. Pectins are generally classified according to the number of methoxyl groups sybstituted on the ester backbone, this classification often being referred to as the degree of methylation (DM). A degree of methylation less than about 50 DM is generally understood in the art to refer to a "low methoxyl" pectin having an average of fewer than about 7 methoxyl groups on the pectin ester molecule, while a pectin classified as being at or greater than about 50 DM is understood in the art as being a "high methoxyl" pectin having an average of 7 or more methoxyl groups per pectin ester molecule. The "high methoxyl" pectins are usually further classified as either "slow set" pectins having an average of about 7 to 10 methoxyl groups, and "rapid set" pectins having an average of more than about 10 methoxyl groups on each molecule of pectin. While the present invention has been found to be suitable for either high or low methoxyl pectins, stronger gels typically will be formed when the so-called high methoxyl pectins are used. Actually, low methoxyl pectins gel by a mechanism different from that of high methoxyl pectin formulations and require the presence of a divalent ion, as described in Ross U.S. Pat. No. 3,185,576.

It is generally recognized that a slow set pectin formulation will have an optimum gelation pH of between about 2.8 and 3.2, while that for a rapid set formulation is between about 3.4 and 3.8, meaning that hydrogen ion concentration needed for effecting gel setting of a rapid set formulation is lower than that needed for a slow set formulation. When the solids content of a formulation is relatively high, such as when it is desired to substantially reduce or completely eliminate a drying operation after the formulation has been deposited into a mold or filled into a container, the solids content must be approximately the same as that needed for the finished product. However, when these higher solids formulations are used, they tend to set prematurely to the extent that, for example, for a slow set formulation, the formulation will set at a pH as high as 3.6, meaning that the formulation will not achieve its optimum pH between about 2.9 and 3.2, whereat maximum gel strength is typically attained. Substantially the same problem is observed with regard to rapid set formulations, except that the pH for premature setting is on the order of about 4.0.

When the pectin food product is in the nature of a confection, the targeted final solids content is usually between about 80 and 85 weight percent, based upon the total aqueous system, being roughly equivalent to a moisture content of between about 15 and 20 weight percent. A pectin gel formulation that is in the nature of a table spread will have a lower solids content and a correspondingly higher moisture content inasmuch as it is necessary that such products be spreadable, a typical solids content for a finished product being in the 68 to 72 weight percent range, the moisture level accordingly being between about 28 and 32 weight percent of the total final formulation.

Advantages can be gained for pectin gel food formulations when they are prepared to contain relatively low quantities of pectin, both from the point of view of economy and from the point of view of reducing potential syneresis problems which are aggravated by the presence of pectin, especially when dealing with the higher moisture content products such as table spreads. Also, relatively high levels of pectin will tend to bring about the problem of premature gel formation whereby a product will not achieve its optimum gel strength, which is particularly important for confection gel products.

It is also generally advantageous to prepare formulations that exhibit "open time", which is understood to refer to the amount of time that elapses between completion of the formulation and when the phenomena of irreversible gel setting is observed. The need to obtain some degree of open time is particularly critical in the pectin confectionery jellie industry, in which formulation batches are prepared, and small quantities thereof are each deposited into starch or rubber molds, the open time permitting deposition of a pre-gelled formulation which gels within the molds. While table spreads are generally deposited into larger containers, it can often be desired to prepare formulations exhibiting an open time adequate to avoid pre-gelling within the container filling machinery whereby the setting will occur within the filled container only, which can bring with it the advantageous effect of achieving a relatively high gel strength with a relatively low amount of pectin to reduce syneresis tendencies.

In the past, open times of limited duration have been achieved by one or more avenues, some of which are discussed in Gallager, L. C. "Pectin Confectionery Jellies", Sunkist Growers, Ontario, California. They includes maintaining the formulation at temperatures as elevated as possible which has some effect in prolonging open time, although not to an extent sufficient to prevent premature gelation in most cases. Another approach is to deposit the formulation at a solids content lower than that desired for the final product and thereafter dry the deposited product in order to raise the solids content and thus enhance gelation, although such a drying procedure is expensive and can damage the final product. Another avenue is to adjust the active acidity or hydrogen ion concentration of the batch with a combination of a food grade acid, such as citric acid or malic acid, and a buffer, such as sodium citrate or sodium acetate. Typically, only part of the food grade acid will be initially added to the batch, while the remainder thereof will be added to the batch just before transferring it to the depositor apparatus in order to drop the pH within the setting range. Even with this last approach, premature gelling will occur unless deposition takes place within just a few minutes. If gelation progresses to a significant extent within the depositor, a weakly gelled final product will be prepared, it will be difficult to obtain a uniform count within a commercial, mechanized operation, and the formed confection jellie pieces will tend to be mishapened.

By the present invention, it has been discovered that the problem of providing adequate open time to substantially eliminate premature setting, the advantage of being able to utilize relatively low amounts of pectin, and the feature of being able to provide finished products having good gel strengths are all attained by replacing some or all of the food grade acid within pectin gelling formulations with a delayed-action or time-release acidulant having a hydrolysis rate such that the hydrogen ion concentration within the total system remains above that at which significant gelling will proceed, such hydrogen ion concentration increasing to gelation levels after a preselected open time has elapsed. Delayed-action acidulants can include anhydrides, esters, lactones, combinations thereof, and combinations thereof with rapidly hydrolyzing food grade acids, provided the overall formulation is an edible one.

It is therefore a general object of the present invention to provide improved pectin gel formulations, methods, and products.

Another object of this invention is an improved method for extending the open time of pectin gel formulations, and products produced thereby.

Another object of this invention is to provide pectin gel formulations which efficiently use the particular pectin therin by permitting gelation to take place at a pH level that is optimum for bringing about gelation within the formulation.

Another object of the present invention is an improved method and products produced thereby, wherein products of desired gel strengths are maintained with formulations having a relatively low level of pectin.

Another object of this invention is an improved method of preparing pectin confectionery jellies while avoiding pre-gelling problems, and gelled products produced thereby.

Another object of the present invention is to provide an improved method, formulation and product produced thereby for in-situ preparation of gelled products within molds or containers.

Another object of this invention is an improved method and formulation utilizing relatively high solids levels in order to substantially lessen or eliminate the need to reduce the moisture content of, or dry, the formulation after deposition into a mold or a container.

Another object of this invention is to provide an improved pectin gel product that resists syneresis, especially when stored in contact with a low moisture product such as peanut butter.

These and other objects of this invention will be apparent from the following further detailed description thereof.

Delayed-action or time-release formulations prepared according to this invention are aqueous, sugar-containing systems that include pectin and an acidulant that works with the sugar to cause the pectin to gel the formulation after a predetermined open time during which gelling does not take place. The acidulant has a relatively slow rate of hydrolysis such that, during the open time, the hydrogen ion concentration within the formulation will be kept below levels that initiate significant gelation.

More particularly, sugar within the formulation can be provided by one or more of sucrose from cane or beet sugar, usually as a mixture with other poly-saccharide or mono-saccharide sweeteners such as corn syrup, sorbitol, xylitol, mannitol, or the like, from natural fruit pulps, extracts, or juices, all within an aqueous environment, which sugar sources provide a major portion of the solids content of the formulation adequate to prepare a final product have a desired moisture content. When a pectin confectionery jellie is being prepared, the typical final product solids content will be between about 76 and 85 weight percent, based upon the total weight of the product, although the solids content can vary according to the texture desired in the final product. A table spread would typically desirably have a lower solids content so that it remains spreadable after it is gelled, typical solids content being between about 65 and 72 weight percent, based upon the total weight of the table spread. In all cases, the solids content can vary somewhat depending upon the mouth feel, spreadability, and physical appearance desired. Generally speaking, formulations according to this invention should have a moisture level or solids content such that the solids content of the finally prepared gelled product is at or above 60 weight percent and below about 90 weight percent, based upon the total weight of the finally prepared product.

Usually, commercially prepared gel formulations contain fruit sources that are not adequate to provide pectin at levels high enough to promote adequate gelling. Accordingly, most formulations will have a supply of pectin added thereto. Most formulations would add a pectin of the high methoxy type, having a degree of methylation equal to or greater than about 45 DM, meaning that an average of about 7 or more of the 14 available acid groups thereof are methoxylated. While low methoxyl pectins can be included in the present formulations, the high methoxyl pectins are preferred. Of the high methoxyl pectins, it is further preferred to utilize "slow set" pectins having an average of about 7 to 10 methoxyl groups per pectin molecule, primarily because high methoxyl pectins of the "slow set" variety are more economical than those of the "rapid set" type having an average of more than about 10 methoxyl groups per pectin molecule.

Total pectin levels within the formulation, whether provided as a separate additive or whether provided from fruit sources within the formulation, need not be as high as those of commercial formulations not in accordance with this invention. Pectin levels in confectionery jellie formulations can be as low as about one weight percent, based upon the weight of the sugar formulation, which is usually roughly also about one weight percent of the total solids within the formulation and within the final product. In standard formulations, the amount of pectin can be as high as three weight percent, which is also a practical, economical upper limit for formulations according to this invention. When preparing formulations for table spreads, the amount of pectin desired will usually be lower than these pectin confectionery jellie formulation levels, typically between about 0.5 and about 1.5 weight percent, although these percentages can vary depending upon the formulation requirements.

The delayed-action or time-release acidulant is one exhibiting a hydrolysis rate such that the total formulation will be provided with hydrogen ions sufficient to initiate gelling after the desired open time has passed. Inasmuch as they are incorporated within food formulations they should, of course, also be edible in the levels at which they are used. Certain delayed-action acidulants, although when they are used alone might not provide the desired hydrolysis rate, can be combined with other, faster hydrolyzing acidulants in order to achieve the desired open time for the total formulation. By the same token, certain delayed-action acidulants according to the invention can exhibit hydrolysis rates that are too fast for achieving a desired open time, and these can be combined with slower-hydrolyzing acidulants as desired.

Delayed-action acidulants include anhydrides and esters, including internal esters such as lactones. The acidulant will be released to its acid form upon hydrolysis of an anhydride or an ester linkage when exposed to water. Examples are the anhydride of any edible acid, such as acetic anhydride, heptanoic anhydride, succinic anhydride, and glutaric anhydride; esters which are combinations of any edible acid and any edible alcohol, for example ethyl acetate, triacetin (glycerol triacetate), and other esters of glycerin, sugars, sorbitol, mannitol, or any of the other edible polyhydroxyl compounds; and lactones such as gluconodelta-lactone, glucuronolactone, propiolactone, butyrolactone, and isovalerolactone.

Preferred for use as the delayed-action acidulant is glucono-delta-lactone. A discussion of the properties of this lactone can be found in "Food Acidulants", Chemicals Division of Pfizer, Inc., Technical Information Bulletin, 1977.

The quantity of delayed-action acidulant to be used in formulations according to this invention will vary widely depending upon the particular acidulent used, the most important variable in this regard being the strength of the acid formed when the acidulant is hydrolyzed. For example, for the preferred delayed-action acidulant, the amount thereof can generally be said to range between about one and about five weight percent, based upon the weight of the sugar solution, which is roughly the same percentage based upon the weight of the solids within the formulation or the final product. Delayed-action acidulants which are stronger acids will have correspondingly lower weight percent ranges, while those that hydrolyze into weaker acids will be incorporated into formulations according to this invention at correspondingly higher weight percent ranges.

Other ingredients can be incorporated into formulations according to this invention, particularly those ingredients that are incorporated in standard gel formulations. Included are food grade acids to bring about an initial lowering of the pH to one that is particularly desirable for the formulation prior to addition of the delayed-action acidulant. Typical of such initial pH values are between about 3.9 and 5.5, depending upon the optimum gelling pH of the pectin within the formulation. Suitable food grade acids include malic acid and citric acid. Usually such food grade acids will be used in combination with a buffer in order to closely control the pH and, when desired, permit enhanced tartness of the formulation by allowing the incorporation of additional food grade acid without significantly further lowering the pH to undesired initial, pre-gelation levels. For example, up to about one weight percent of a buffer such as sodium citrate could be added, as could about one weight percent of a food-grade acid such as malic adid. Quantities of other ingredients will typically be relatively minor and will be generally on the order of the amounts that they are used in traditional formulations. Miscellaneous other typical ingredients include flavoring compounds, coloring agents, and the like.

When proceeding with the method according to this invention, an important aspect thereof is the incorporation of a delayed-action or time-release acidulant within a pectin gel formulation having an initial pH significantly higher than that of the optimum gelation pH of the pectin contained within the formulation. By this method, it is possible to achieve a significant open time to permit deposition into molds or containers and thereafter have the hydrogen ion concentration within the deposited formulation increase to achieve such optimum pH level of the pectin, with the result that relatively less pectin is needed in order to achieve a desired high gel strength.

More particularly, the method includes preparing a pectin aqueous formulation including a sugar-containing syrup and a pectin. Depending upon the particular formulation, it is then typically necessary to lower the pH of the formulation in order to provide it with an initial pH that is significantly higher than the optimum gelling pH for the particular pectin incorporated into the formulation. Generally, these various ingredients are simply blended together, cold tap water or the like being added as necessary, accompanied by agitation in order to provide a relatively homogeneous blend for the purpose of preparing a generally consistent final product. The blend is then boiled or cooked at a temperature in excess of 100° C. (212° F.), usually between about 222° and 235° F., the temperature at ambient pressure being controlled as desired in order to achieve a formulation have a pre-selected solids or moisture content, the cooking generally preparing a colloidal solution of pectin.

After cooking has been completed, the delayed-action acidulant is added and blended into the cooked formulation or colloidal solution formulation, which results in the step of providing a predetermined open time during which hydrolysis of the delayed-action acidulant within the formulation will proceed slowly enough in order to delay gelling or setting of the formulation until after the preselected open time has elapsed.

The length of the open time is almost exclusively a matter of choice. Usually, in order to facilitate deposition within commercial filling or depositing machinery, an open time in excess of five minutes, usually ten minutes or longer, such as thirty to sixty minutes, will be desired. Open times of in excess of hundreds of hours can be provided, should this be desired, although in most commercial operations, this would add a processing time feature that would be economically undesirable. Sometimes, an especially long open time can be advantageous when it is desired to continue to develop the set or the tartness of a product while in storage. Typical desired open times will be between 6 and 20 minutes.

Next, the formulation to which the delayed-action acidulant had been added will be filled into an appropriate container, such as a starch mold, a rubber mold, a glass jar, a sealable can, or a pouch. While therewithin, an in-situ gelling or setting step will take place in order to provide a final product having a predetermined gel strength. After the jellies are removed from their molds, they typically are "sanded" with granular sugar to provide a non-sticky product.

When coloring ingredients or flavoring agents are to be incorporated into the formulation, it is generally preferred that they be added after the cooking step so as to minimize flash off of flavor essences and deterioration of colors.

The initial pH of the formulation will be between about 4 and about 5.5. After in-situ hydrolysis and acidulation, the pH will be lowered to the optimum gelation pH for the particular pectin used. For example, a typical optimum gelation pH for a slow set, high methoxyl pectin will be between about 2.9 and about 3.2 or 3.3, while that for a rapid set, high methoxyl pectin will be between about 3.2 or 3.3 and about 3.6 or 3.7. Optimum gelation pH levels will also vary with the "grade" of the pectin, the values given herein generally being applicable for a 150 grade pectin.

Usually during such hydrolysis, a relatively low quantity of water within the formulation will be used up, which is of assistance in reducing the amount of water that is found in the final product or that has to be dried out of the deposited or filled product. For example, the amount of water used by 2.5 weight percent of glucono-delta-lactone in an 82 weight percent solids batch will increase the solids content thereof between about 0.05 and 0.1 weight percent. This is another aspect of the invention which can be useful in preparing formulations of predetermined solids content while reducing the amount of drying needed to form a final product having such solids level.

Products according to this invention are products that have been set from pectin gel formulations. The products include a gel network or matrix of sugar-type solids, the gel including pectin, acidulants, and other conventional ingredients such as flavorings, colorings, tartness enhancers, buffers, and the like. The gel will have a moisture level between about 28 and 35 weight percent, based upon the total weight of the formulation, when the product is of the table spread type, such as a jam, a jelly, a conserve, or a marmalade. When the products are pectin confectionery jellies, the moisture content will be somewhat lower, usually between about 15 and 24 weight percent, based upon the total weight of the product.

Table spread products prepared according to this invention are characterized by particularly effective utilization of pectin within the formulation. Poor pectin utilization can result in a soft, runny gel, or syneresis may be evident by the presence of fluid apart from the gel structure, which is most noticeable when the product has been disturbed, such as when it is spooned or spread on bread. These types of problems are particularly evident in products not according to this invention in which premature gelling has begun before the product is filled into its container, resulting in a disturbance of the gel structure. Syneresis of table spread formulations tends to become an increasing problem for the portions of formulation batches that are filled from the "bottom" of the batch, while those filled from a freshly prepared batch tend to exhibit fewer syneresis problems.

Products according to this invention, since they have been substantially completely gelled only in-situ, the gel structure, once formed, is not subsequently disturbed until it is consumed. In formulations not according to this invention, extra pectin is typically included within such products in order to increase gelling within the container so as to mask gel disturbance and attempt to reduce syneresis. Such additional pectin is not needed for formulations according to this invention.

Table spread products according to this invention can be prepared such that they are filled into containers with the product moisture level being relatively low while avoiding premature gelling prior to filling. Such relatively low moisture levels are particularly suitable for products that are prepackaged layers of the low moisture table spread with another spread of traditionally very low moisture content, such as peanut butter, with the result that the gelled table spread moisture level is much closer, or equal to, the moisture level of the other spread to thereby retard undesirable moisture transfer between the layers of the different spreads.

Pectin confectionery gel products according to this invention can be in either cast or slab form. The amount of solids in cast jellie products is usually between about 72 and 78 weight percent, although a higher solids content can be desirable to reduce or eliminate drying, and in a preferred embodiment of this invention, the formed and cast jellie product will have the solids content of a particularly desirable finished product, typically between about 80 and 85 weight percent. Although such higher solids content cast jellies require more fluidity to conform to the shape of the mold and prevent stringing, and require greater open time because of slower depositing times, these problems are generally substantially eliminated by products in accordance with this invention. Slab jellies of conventional formulations may show some gelation before the batch is leveled off, and this problem of lost gelling power is traditionally compensated for by adding pectin at levels higher than otherwise necessary, which compensation adjustment is not necessary in products of this invention.

When the product prepared according to this invention is to have a high tartness level, such as that characteristic of a citric acid fruit, the product can include additional amounts of food grade acids. The amount of tartness achieved is a function of the equivalent weight and the amount of the acid used, such acids being weak organic acids, for example citric acid, malic acid, tartaric acid, fumaric acid, acidic acid, succinic acid, lactic acid, and adipic acid. When a particularly high tartness level is needed which would lower the pH to below the desired initial pH level, the pH of the total formulation can be maintained by a suitable buffer, such as an alkali metal salt of any of the just-listed organic acids. Also, sugars within the system can impart a slight degree of buffering activity to the formulation.

Fruit gel products should have a relatively high titratable acidity, usually between about 8 to 15 meq/100 g, while products having spice or mint flavors or the like would typically have no organic acid added thereto. Within limits of food grade use, small quantities of mineral acids can be used to lower pH without achieving any significant titratable acidity. Titratable acidity can be arrived at by dissolving a sample of about 10 grams in warm water with agitation, after which it is then titrated to a phenothaelin endpoint with 0.1 N sodium hydroxide. The titratable acidity is expressed in meq/100 g of sample, which is equivalent to ten times the volume of sodium hydroxide titrated (ml) divided by the weight of the sample (grams).

Confectionery jellie products prepared according to this invention make use of the basic requirement that the hydrolysis of the delayed-action acidulant proceed slow enough to allow enough open time to fill receptacles, molds, or slabs, but fast enough to lower the pH to a suitable place to get a firm enough piece for handling in the desired time. This can be referred to as the handling pH, which does not have to be as low as the optimum gelation pH for the particular pectin used, which optimum pH can be reached at a later time during the process or while the final product is in its container. The hydrolysis should be such that the half life of the reaction is 2 minutes to 2 hours under the conditions of preparation, a preferable half life range being on the order of between 3 to 15 minutes.

The smaller the batch of a formulation and the faster the rate of fill, the less open time will be required. For instance, a typical table spread batch will be more advantageously prepared with a longer open time than that for a pectin confectionery jellie formulation being deposited into small starch or rubber molds.

Open time can conveniently be measured by means of a GT-4 gelation timer (Techne Corporation) which instrument has a plunger or disc that oscillates up and down at ten strokes per minute and is recorded on a digital readout counter, the machine generally being insensitive to viscosity changes. When this plunger is submerged in a sample of a just-prepared formulation, it will continue to oscillate until cross-linkage or gelation occurs, at which point it shuts off and thereby records the time to gelation. "Open times" provided herein were measured by such an instrument.

It is possible to determine gel strengths for table spread products by the IFT "Sag" method ("Pectin Standardization", *Food Technology*, Vol. XIII, No. 9, pages 496-500, 1959). The gel strength is expressed in pounds of sugar gelled by one pound of pectin in order to give a gelled product "sag" of 23.5 percent under the standard conditions of the IFT test.

In measuring the gel strength of pectin confectionery jellie products, the following procedure can be used, and was the one used in arriving at the gel strength values reported herein. Muffin cups, 1⅛ inch deep and having a rim diameter of 2¾ inches were filled to the top with the particular sample, after which they were sealed with aluminum foil to prevent water evaporation and skin development. They were then allowed to set over night to develop a full gel strength, after which the samples were placed on a top loading balance and tared to zero. A 5/16 inch diameter rod was suspended in a guide tube vertically over the sample, the rod fitting loosely in the tube to allow free fall. The rod was rapidly depressed at an even rate until the gel was ruptured, and a reading in grams on the scale was recorded. Ten readings were taken on each sample and averaged. It was determined that, with such a test, a difference in the averaged readings of about 50 grams would be a significant difference at a 95% confidence level. A value of about 400 grams was determined to be a good average gel strength for a pectin confectionery jellie, with about 250 to 300 grams being a minimum acceptable value.

The following specific examples will more precisely illustrate the invention and the scope thereof and teach the procedures presently preferred for practicing the same, as well as illustrate improvements and advantages thereof.

EXAMPLE 1

This example illustrates the preparation of pectin confectionery jellies and some of the physical properties of such gelled products.

A pectin dry blend was prepared by mixing 30 grams of sucrose with between 2 and 6 grams of "slow set" high methoxyl pectin (62 to 65 DM), between 0 and 1.0 grams of sodium citrate, and between 0 and 0.75 grams of malic acid after which each prepared sample of pectin dry blend was wetted with from 25 to 50 cc of cold tap water, the larger volumes of water being needed for the larger amounts of pectin in the blend. Each solution thus prepared was allowed to stand for at least 30 minutes. A sugar solution was made by blending 120 grams of sucrose and 100 grams of regular conversion corn syrup (80 weight percent solids) with about 50 cc of water to wet out the sucrose. This was heated to 180° F. to dissolve the sucrose at which point the wetted pectin solution was added. This buffered, pectin sugar solution was boiled to a temperature between 220° and 232° F. depending on the solids desired. Then it was cooled to between about 200° and 210° F. at which point a second quantity of acidulant was added. Malic acid was used in some of the samples while glucono-delta-lactone (GDL) was added to others. As soon as the chosen acidulant was well blended in with vigorous agitation, a portion of each sample was transferred to a muffin tin for gel strength determination. The rest of each sample was placed under the plunger of a GT-4 Techne gel timer for a mechanical reading of the open time, and the pH was read after the tests had been completed. The data are set out in Table I.

TABLE I

| Sample | A | B | C | D | E | F | G | H | I | J |
|---|---|---|---|---|---|---|---|---|---|---|
| Pectin: | | | | | | | | | | |
| (grams) | 2.0 | 3.0 | 3.0 | 4.0 | 5.0 | 4.0 | 6.0 | 3.0 | 3.0 | 5.0 |
| (% of Sugars) | .87 | 1.30 | 1.30 | 1.74 | 2.17 | 1.74 | 2.61 | 1.30 | 1.30 | 2.17 |
| Sodium Citrate | | | | | | | | | | |
| (grams) | 0.4 | 1.0 | 0.4 | 0.4 | 0.4 | 1.0 | 1.0 | 0 | 0 | 0.4 |

TABLE I-continued

| Sample | A | B | C | D | E | F | G | H | I | J |
|---|---|---|---|---|---|---|---|---|---|---|
| Malic Acid (grams) | 0.3 | .75 | 0.3 | 0.3 | 0.3 | .75 | .75 | 0 | 0 | 0.3 |
| Boiling Point (°F.) | 230 | 230 | 228 | 230 | 230 | 225 | 230 | 230 | 230 | 230 |
| Solids (wt. %) | 82 | 81 | 82 | 83 | 81 | 76 | 77 | 82 | 83 | 82 |
| pH of Final syrup | 3.3 | 3.3 | 3.1 | 3.3 | 3.1 | 3.4 | 2.9 | 3.3 | 3.0 | 3.1 |
| Second Acidulant | Malic | Malic | Malic | Malic | Malic | Malic | Malic | GDL | GDL | GDL |
| (grams) | 1.5 | 2.5 | 2.7 | 1.8 | 2.7 | 3.0 | 6.0 | 2.0 | 4.0 | 5.5 |
| Gel Strength (grams) | 229 | 464 | 439 | 654 | 560 | 269 | 400 | 426 | 501 | 876 |
| Open Time (minutes) | 0.9 | 3.7 | 0 | 0.4 | 0 | 10.8 | 0.2 | 12.2 | 6.5 | 10.8 |

Samples F and G had a significantly lower solids than did the other samples. There is a noted reduction in the strength of the gel as can be seen by comparing these results with samples D and E. All of the samples show that an increased pectin content provided a stronger gel. The effect of these two variables on the gel strength is shown in FIG. 1.

All of these samples, except perhaps Sample F, were in a pH range where the optimum gel strength for the pectin used is obtained. However, this pH is difficult if not impossible to use in the commercial production of such confections when accompanied by the very short open time of the malic acid runs at the optimum pH. There has to be sufficient open time to deposit the batch into molds or pour it on a slab. Times of 10 minutes or greater are preferred although an exceptionally well operated plant could operate with some success at times down to 2 to 3 minutes. Samples B and F are the only two samples prepared entirely with malic acid that had any significant open time. This is attributed to the fact that they were in the upper part of the acceptable pH range. Furthermore, sample F has lower solids which also delays the gel time. All the GDL samples had ample open time.

EXAMPLE 2

Figure 2:
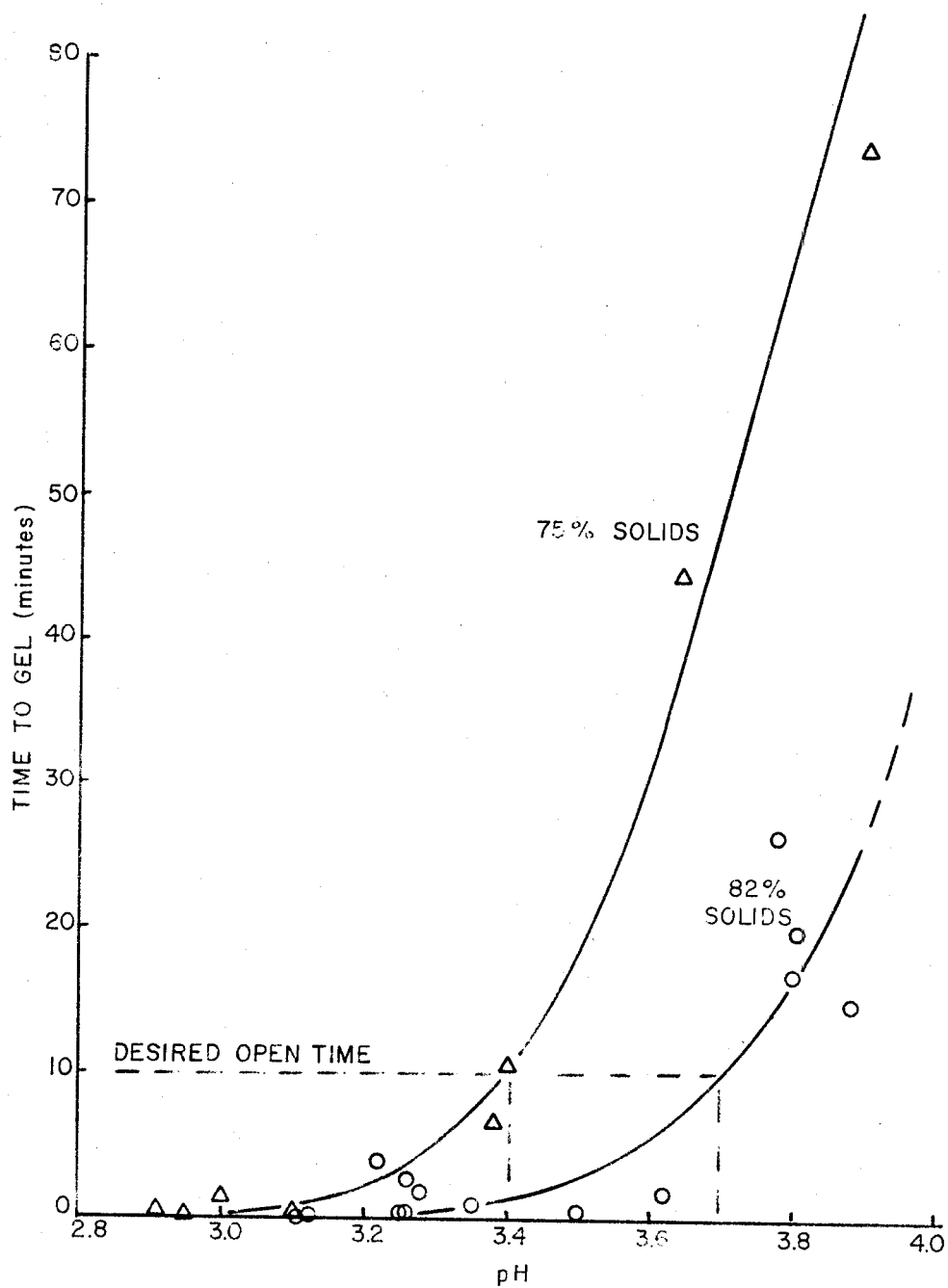

Illustrated in this example is an important relationship between pH and open time, the data of this example being plotted in FIG. 2. These data are grouped onto two curves, one of high solids formulations (about 82 weight percent), and the other of medium to low solids formations (about 75 weight percent), the curves indicating that in order to achieve a desired minimum open time of about ten minutes for these formulations, a pH not lower than about 3.4 should be sought for solids formulations of about 75 weight percent, while a pH not lower than about 3.65 should be the target for solids formulations of about 82 weight percent. When a high solids sample was formulated to have a pH below about 3.5, gelling was generally observed before stirring could be completed, indicating that substantially no open time was provided.

These data show that, for example, if it is desired to substantially eliminate drying of a confectionery pectin jellie by formulating the batches to be deposited so they have the solids content of a finished confectionery piece, between about 80 and 85 weight percent, it is necessary to maintain the pH of the batch formulation at or above 3.6 in order to provide adequate open time for commercial depositing. Because of variations in the formula of each sample, including the type of pectin, the amount of pectin, and differences in the preparation procedures and techniques of properties measurement, the data shown in FIG. 2 are somewhat varied.

EXAMPLE 3

Additional tests were run to compare the open time and the gel strength obtained when using delayed-action or time-release acidulant in accordance with this invention when compared with that obtained with a traditional procedure. A typical procedure is to boil the batch to a lower temperature resulting in a lower solids level. Furthermore, the recommended pH after the addition of the second acidulant is 3.5±0.1. Four samples were prepared according to the procedure in Example 1. Slow set pectin was used in all these samples. The sample parameters and results are given in Table II.

TABLE II

| Sample | L | M | N | O |
|---|---|---|---|---|
| Pectin: (grams) | 4.0 | 4.0 | 3.0 | 3.0 |
| (% of sugars) | 1.74 | 1.74 | 1.30 | 1.30 |
| Sodium Citrate (grams) | 1.0 | 1.0 | 1.0 | 0 |
| Malic Acid (grams) | .75 | .75 | .75 | 0 |
| Boiling Point (°F.) | 225 | 225 | 230 | 230 |
| Solids (wt. %) | 76 | 76 | 82 | 83 |
| Post Boiling Acidulant | Malic | Malic | GDL | GDL |
| (grams) | 3.0 | 3.0 | 5.0 | 4.0 |
| pH of Final syrup | 3.6 | 3.4 | 3.2 | 3.0 |
| Open Time (minutes) | 44.5 | 10.8 | 35.5 | 6.5 |
| Gel Strength (grams) | 237 | 269 | — | 501 |

Samples L and M were prepared according to traditional procedures by keeping the solids low and the pH high, the target pH value being 3.5, to achieve an acceptable open time, the pH being greater than the optimum pH for gel strength by this pectin, which is reflected in the very low gel strength values. Such formulas could be spread on a slab, allowed to set, cut and sanded with sugar in which case the final solids would be close to that of the syrup. However, such products are prone to sweating. Another method would be to cast such confections into starch molds and dry at 140° to 160° F. for 8 to 24 hours to bring the solids up to 82 to 85%.

Samples N and O were prepared according to the invention. The open time was comparable to the traditional methods even though the pH values were significantly lower and near the optimum gelation pH for the pectin used in the formulation. The lower pH allowed better utilization of the pectin so that 25% less could be used. Still, the gel strength of the finished product was well in excess of the traditional procedure. Further, this method eliminated the need for drying and the product could be sanded immediately after it had set.

EXAMPLE 4

Five batches of sugar syrup were prepared with levels of sodium citrate, malic acid, and GDL to illustrate the relationship between the buffer and acids to the tartness levels, finished pH and time release. A 73% sugar solution the solids of which consisted of 40% regular corn syrup and 60% sucrose, was prepared to which various levels of sodium citrate and malic acid were added to give initial pHs of 4.0 and 4.5. Then enough GDL was added to give a final pH of 3.3 after hydrolysis. The variables and results are shown in Table III.

TABLE III

| Sample | Q | R | S | T | U |
|---|---|---|---|---|---|
| Sodium Citrate (wt. %) | .077 | .163 | .227 | .242 | .593 |
| Malic Acid (wt. %) | .135 | .133 | .398 | .264 | .648 |
| GDL (wt. %) | 1.43 | 2.13 | 2.12 | 2.80 | 3.44 |
| Initial pH | 4.0 | 4.5 | 3.8 | 4.1 | 4.0 |
| pH at equilibrium | 3.2 | 3.4 | 3.3 | 3.3 | 3.3 |
| Titratable Acidity (meg/100g) (calculated) | 8.0 | 10.9 | 14.9 | 15.7 | 24.2 |
| Titratable Acidity (meg/1-0g) (measured) | 5.8 | 12.5 | 15.3 | 15.5 | 22.5 |
| Tartness Score | 1.3 | 1.8 | 3.5 | 4.3 | 4.3 |

The titratable acidity was measured by titration. Since only 75% of the GDL is hydrolyzed at equilibrium, the phenothaelin end point fades as more of the lactone hydrolyzed. Therefore, the end point was taken as the value when the color persisted for 15 seconds. Only 75% of the amount of the GDL was used in the calculation of the titratable acidity for this same reason, and the values agree fairly well. These samples were ranked in order of tartness by experienced panel with the smallest numerical value representing the least tart. Samples Q and R were significantly less tart than the other three at a 95% confidence level. On the whole, the ranking does indicate that the titratable acidity is a good measure of tartness.

Figure 3:
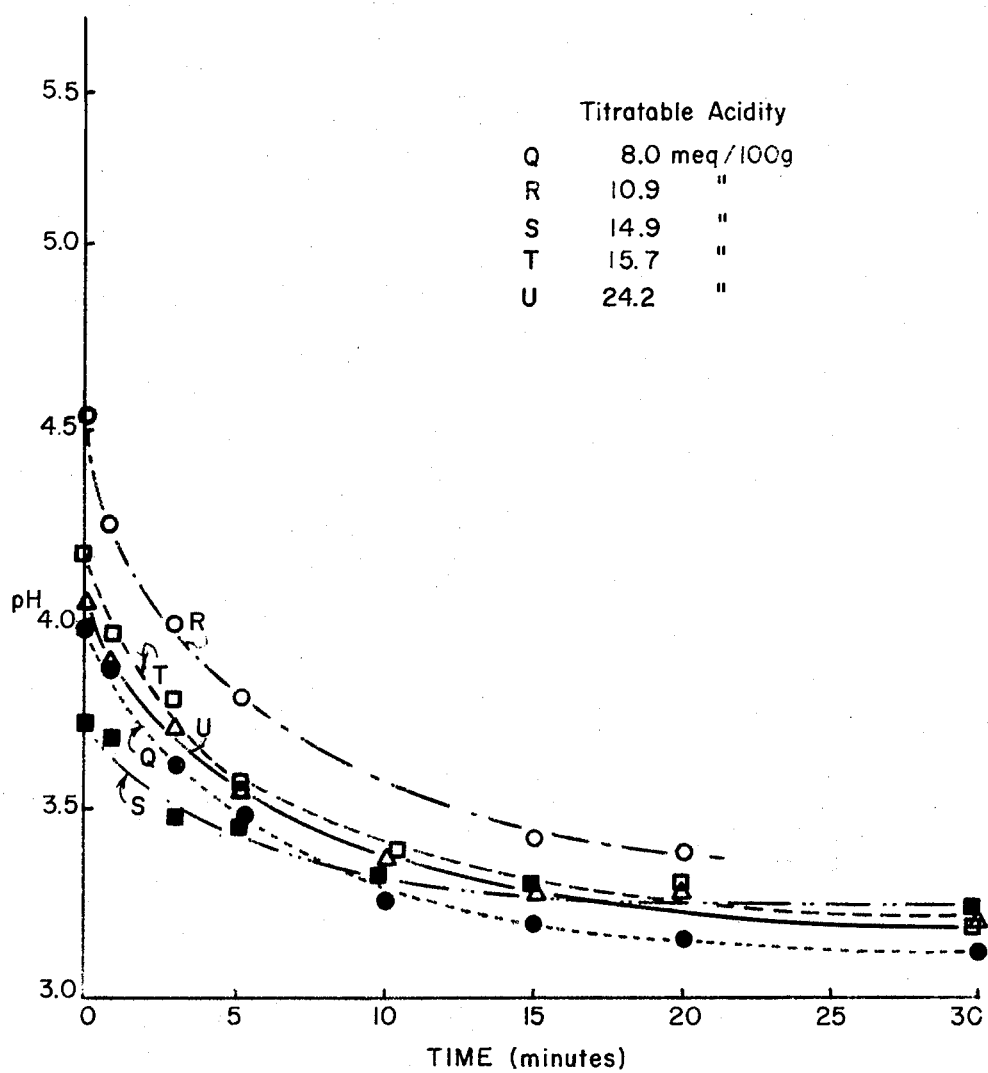

The hydrolysis rates of these samples was followed by observing the pH. The values are shown in FIG. 3, its curves demonstrating that pH lowering to below about 3.4 to 3.6 takes longer for the formulation having an initial pH of 4.5 than for those formulations having a lower initial pH, and the plots of the curves indicate that the overall hydrolysis rates for these samples are generally the same.

EXAMPLE 5

Figure 4:
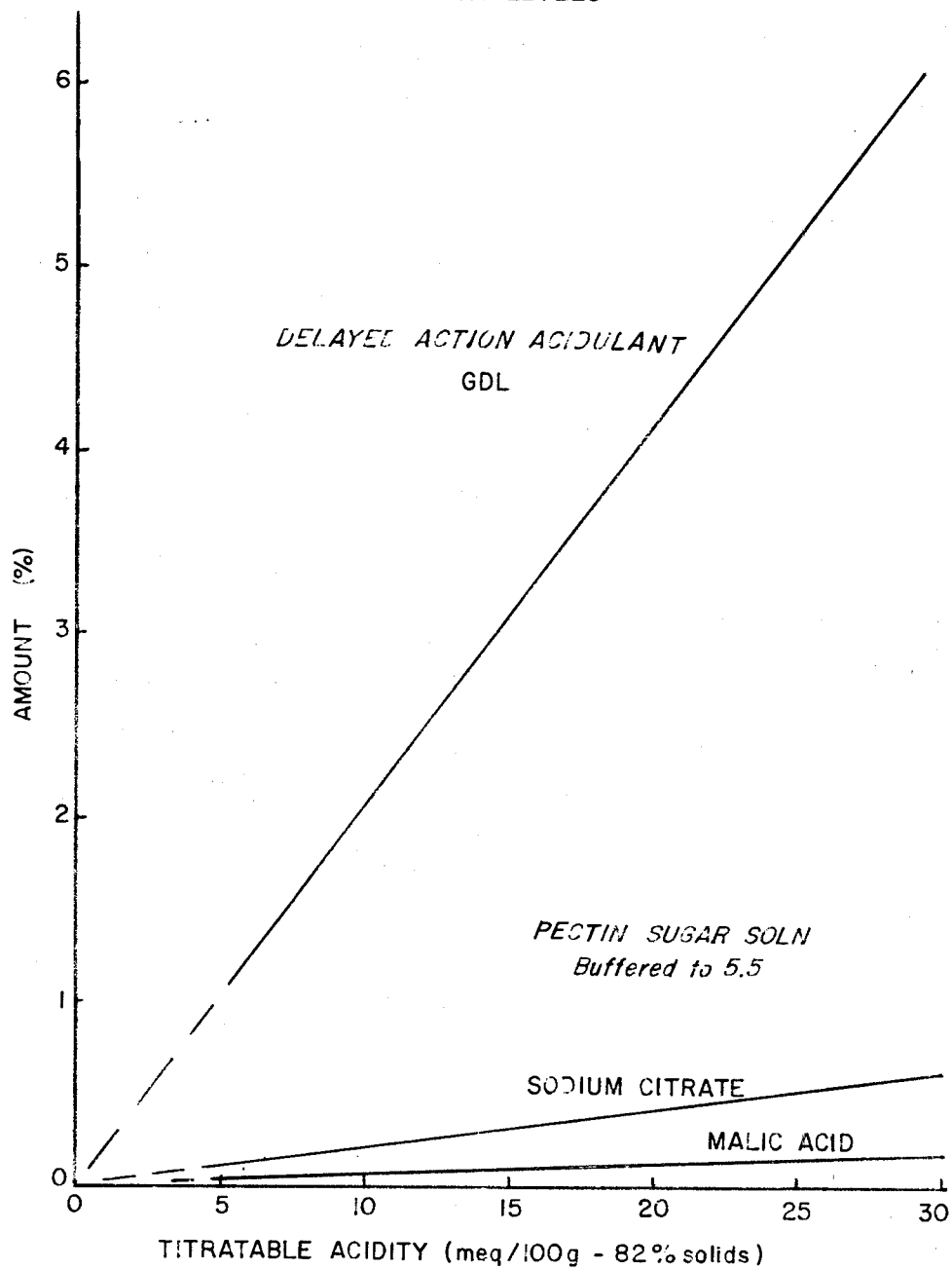
Figure 5:
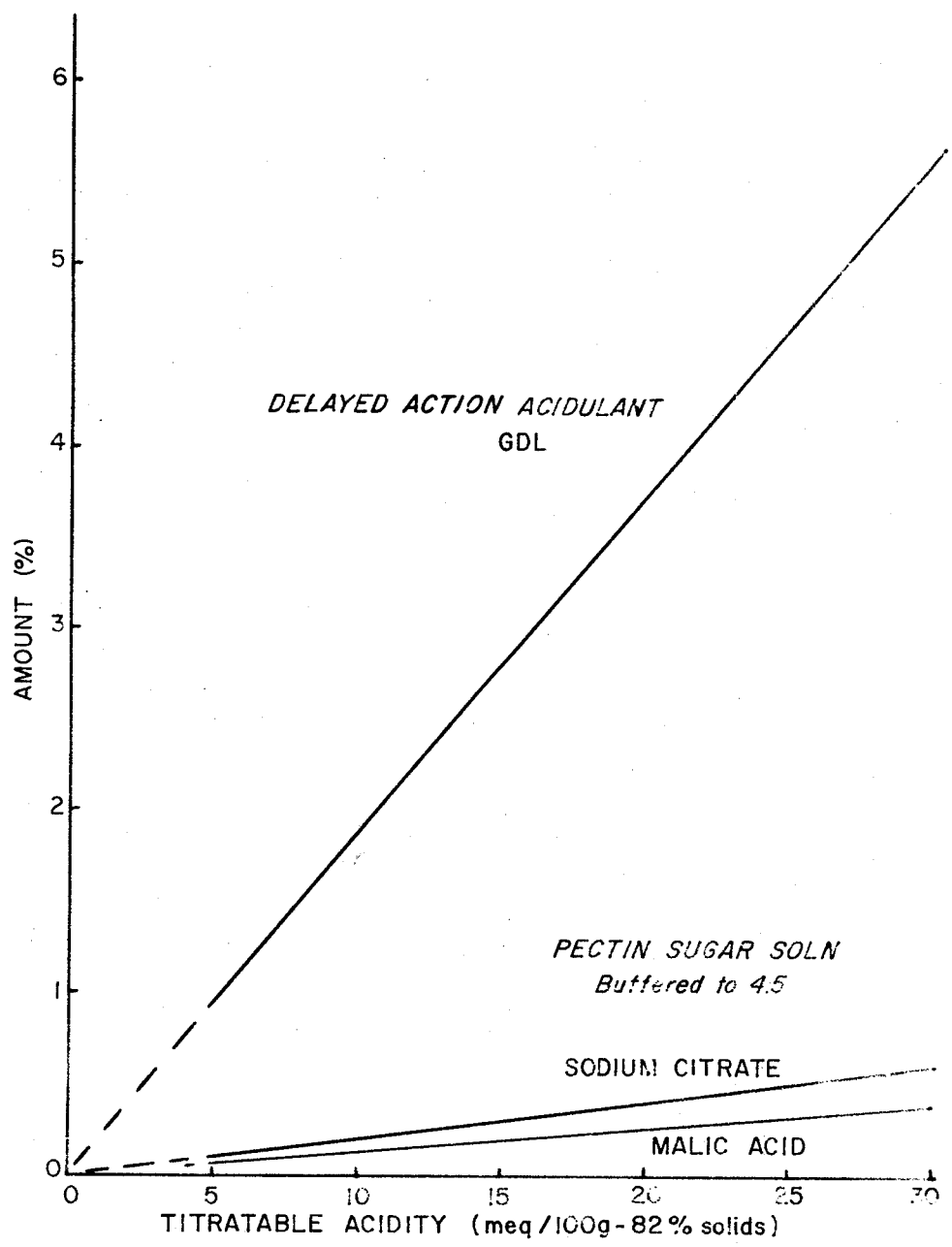

The amounts of sodium citrate and malic acid to obtain a given initial pH in a buffered pectin sugar solution and the amount of GDL to add to obtain a final pH of 3.0 can be calculated using the mass action equilibrium relationships. Several such calculations can be made and plotted to show the relationship of acid and buffer to the titratable acidity. This is shown in FIGS. 4 and 5 for two initial pH values, namely 4.5 and 5.5. The ratio of sodium citrate to malic acid for the higher pH is greater than for the lower pH, thus, more GDL has to be used to reduce the pH to 3.0 in order to obtain the same titratable acidity in the former case. The levels of buffer and acids from sample R in Example 4 demonstrates the application of FIG. 5.

In further illustration, differing titrable acidities of jelly formulations in accordance with this invention can be prepared by varying the amounts of sodium citrate, citric acid, and GDL used. A formulation having a 0.1 M solution of sodium citrate (0.46 weight percent), 0.058 weight percent citric acid, and 5.3 weight percent GDL has a calculated total titratable acidity of 23.4 meq/100 g, a relatively high acidity value. A relatively low acidity value of 10.9 meq/100 g is calculated from a system having 0.05 M (0.23 weight percent) sodium citrate, 0.029 weight percent citric acid, and 2.49 weight percent GDL. A moderate and generally more desirable calculated titratable acidity value of 16.4 meq/100 g is arrived at using 0.33 weight percent sodium citrate, 0.04 weight percent citric acid, and 3.74 weight percent GDL. Any one of these formulations would be expected to achieve a pH of about 3.0 after deposition, using a "slow set" high methoxy pectin.

EXAMPLE 6

When it is desired to prepare formulations for non-acidic flavors, the titratable acidity should be as low as possible, and this can be accomplished by omitting the acid and the buffer. A formulation of this type, having properties similar to those of Example 5, has a calculated titratable acidity of 0.09 meq/100 g with a total GDL content of 0.02 weight percent. Actually slightly more GDL is needed since when the formulation has sugars that have a buffering capacity, that needs to be adjusted for by the acidulant. This buffering capacity is insignificant when a buffer such as sodium citrate is present at a level at or above 0.03 M.

EXAMPLE 7

In this Example, a formulation similar to those in Examples 5 and 6, can be prepared by using a combination of GDL and of triacetin (glycerol triacetate) as the delayed-action acidulant. A titratable acidity of about 18 meq/100 g is arrived at on the basis of 0.18 weight percent sodium citrate, 0.02 weight percent citric acid, 2.00 weight percent GDL, and 0.50 weight percent triacetin, the formulation having an initial pH of 5.5, and a finished product pH of 3.0, the pH dropping to about 3.1 within 30 to 60 minutes, and then to about 3.0 after three or four days, the tartness level increasing during that time period until the slowly hydrolyzing triacetin is fully hydrolyzed.

EXAMPLE 8

A variety of formulations were prepared, and the open time and gel strength developed for each sample was measured, the data being reported in Table IV, all percentages being weight percent based on the sugar solution.

In each case, the post-boiling acidulant was added after the sugar solution had been boiled and allowed to cool to below the boiling point. All samples were prepared using slow set pectin level. For samples W, W', X and X', the amount of pectin was cut to about 60% of the level used in most commercial pectin gel formulations, which lower amount was found to effect both the gel strength and the rate of set. Open time achieved using GDL was greater than that when using malic acid while maintaining the same pH, the same pectin levels, and substantially the same solids percentages, and the gel strength of the GDL formulations was substantially equal to or better than that using malic acid. It will also be noted that Sample Y', having the customary amount of pectin in the formulation, achieved a very high gel strength.

TABLE IV

| Sample | W | W' | X | X' | Y | Y' |
|---|---|---|---|---|---|---|
| Pectin (grams) | 3 | 3 | 3 | 3 | 5 | 5 |
| (% of Sugars) | 1.30 | 1.30 | 1.30 | 1.30 | 2.17 | 2.17 |
| Sodium Citrate (grams) | 1.0 | 1.0 | 0 | 0 | .4 | .4 |
| Malic Acid (grams) | .75 | .75 | 0 | 0 | .3 | .3 |
| Solids (wt.%) | 81 | 82 | 84 | 83 | 81 | 82 |
| Post-boiling Acidulant | Malic | GDL | Malic | GDL | Malic | GDL |
| (grams) | 2.5 | 5.0 | 1.0 | 2.0 | 2.7 | 5.5 |
| pH | 3.2 | 3.2 | 3.3 | 3.3 | 3.1 | 3.1 |
| Open Time (minutes) | 3.7 | 35.5 | 1.7 | 12.2 | 0 | 10.8 |
| Gel Strength (grams) | 464 | — | 433 | 426 | 560 | 876 |

EXAMPLE 9

Delayed-action or timed-release acidulants according to this invention which are lactones similar to GDL (hydrolysis rate of $2.3 \times 10^{-5}$/second) include beta-propriolactone ($5.6 \times 10^{-5}$/second), and beta-butyro-lactone ($1.4 \times 10^{-5}$/second) either of these two being similar to GDL in delayed-action acidulation. Another lactone, beta-isovalerolactone has a hydrolysis rate of $1.35 \times 10^{-3}$/second, which is somewhat faster than the GDL rate.

Figure 6:
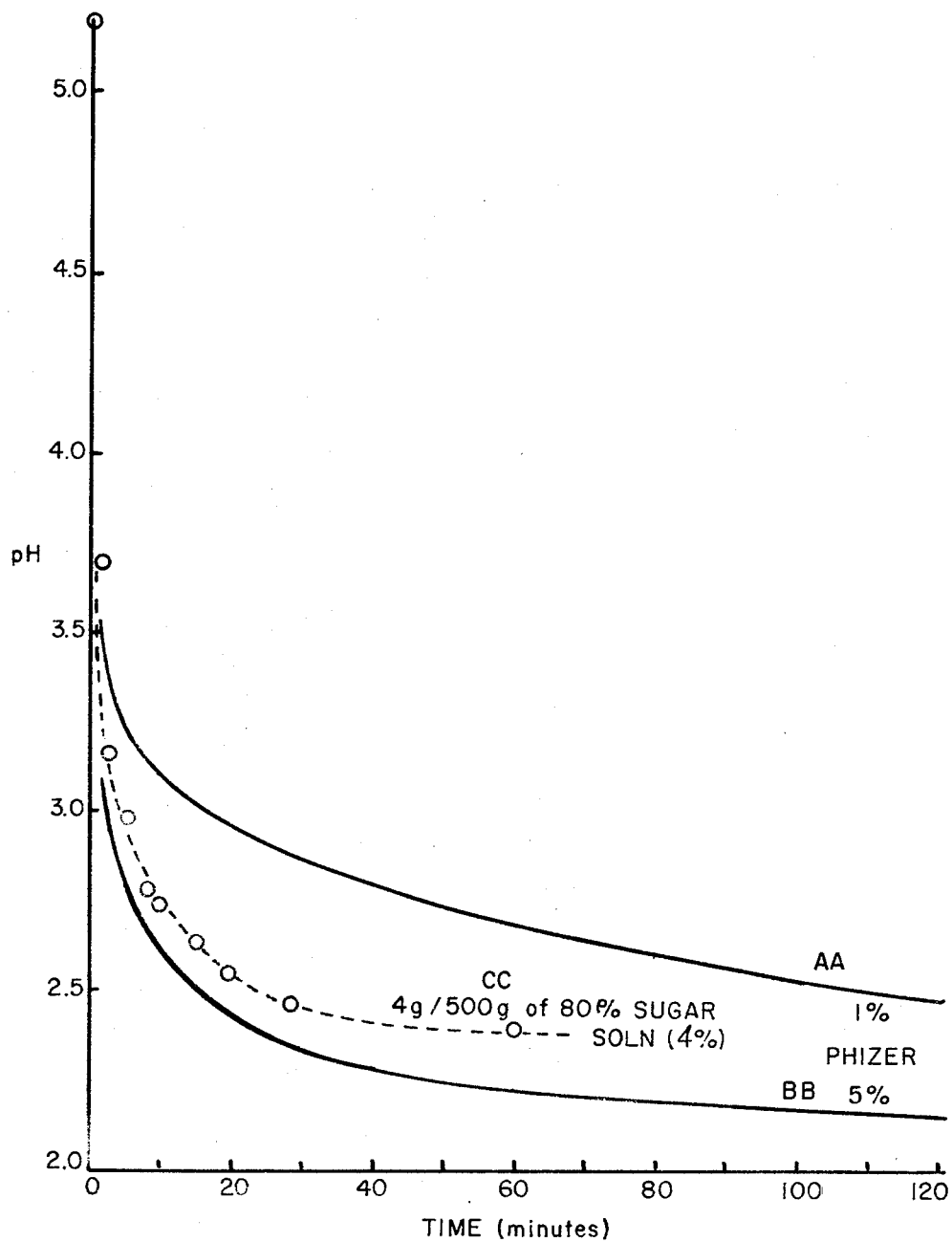

These hydrolysis rates are in water, and generally indicate expected variation of pH over time when added to water. A hydrolysis rate for a delayed-action acidulant within the types of sugar solutions utilized according to this invention is similar to the hydrolysis rate for that acidulant in water. Data in this regard are provided in FIG. 6. Curve AA is that of a one weight percent solution of GDL in water (Food Acidulants Technical Information, Pfizer, 1977), and curve BB is that of a 5 weight percent GDL solution in water (ibid), while curve CC, which approaches curve BB, is that of a sugar solution that had been prepared to have a solids content of about 60% sucrose and 40% regular conversion corn syrup, the sugar solution having been boiled to 230° F. to provide a solids content of 82 weight percent, after which it cooled to about 200° F., 4 grams of GDL were added for each 100 grams of water (0.225 M), and while the temperature was maintained between 170 and 200° F., pH measurements were taken periodically for 80 minutes, the generated data being shown on curve CC.

EXAMPLE 10

Figure 7:
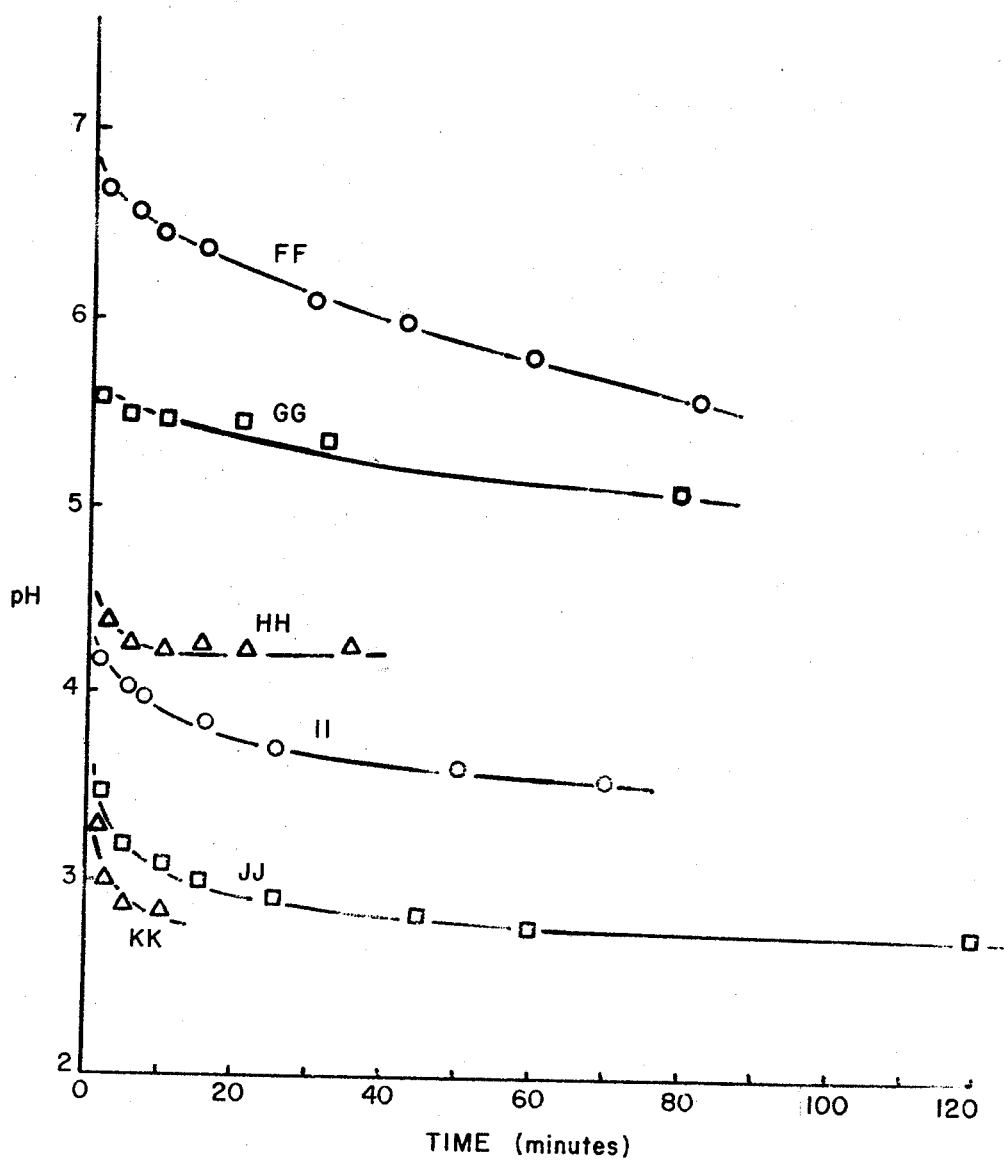

Hydrolysis rates for delayed-action or timed-release acidulants having properties illustrating their usefulness either alone or with other acidulants are depicted by plots of pH drop over time, shown in FIG. 7.

Curve FF plots pH vs. time for glucurono-lactone, the pH reaching 3.28 after 1,145 minutes, indicating a very slow hydrolysis rate and a suitability for use in combination with quickly hydrolyzing acidulants in order to provide a delayed-action acidulant having a desirable open time. Curve GG is for triacetin within an unbuffered sugar solution; its hydrolysis rate was found to be slow, eventually reaching a pH of 2.80 after 7080 minutes, indicating usefulness in combination with quickly hydrolyzing acidulants. Triacetin is especially suitable for use in sugar solutions since it is a liquid; it is a good carrier for powdered acidulants; it is useful as an agglomerating agent for powdered materials, particularly those that have a tendency to lump, to facilitate wetting out the dry acidulants as they are added to the sugar syrup; and it has a tendency to defoam the syrup.

The timed pH drop for heptanoic anhydride is plotted on curve II, showing a rather favorable rate. This material exhibits defoaming properties, but it suffers from the disadvantage of not being particularly suitable for use in foods. Curves HH, JJ, and KK plot the pH drop rates for acetic anhydride, succinic anhydride, and citraconic anhydride. The acetic anhydride and succinic anhydride were tested in buffered sugar solutions starting at a pH of 5.3, while the citraconic anhydride was tested in water. Each of these three compounds has a tendency to hydrolyze rapidly, acetic anhydride and citraconic anhydride being generally too fast to be used alone as a delayed-action acidulant in accordance with this invention, but being useful in combination with a slowly hydrolyzing acidulant. Succinic anhydride, while also having a hydrolysis rate generally too fast for use alone as a delayed-action acidulant, its rate is somewhat slower, making it particularly suitable for achieving a desirable rate by blending with and using in combination with one or more of the slower acidulants. For example, having a half life of about 2 minutes, it can be suspended in triacetin, having a half life of about 3,600 minutes in accessible suspension ratios to prepare a formulation having an overall half life of about 10 minutes, half life being the time at which the pH is half way between the pH prior to addition and the pH of the product after sufficient time to reach hydrolysis equilibrium has been reached.

EXAMPLE 11

Figure 8:
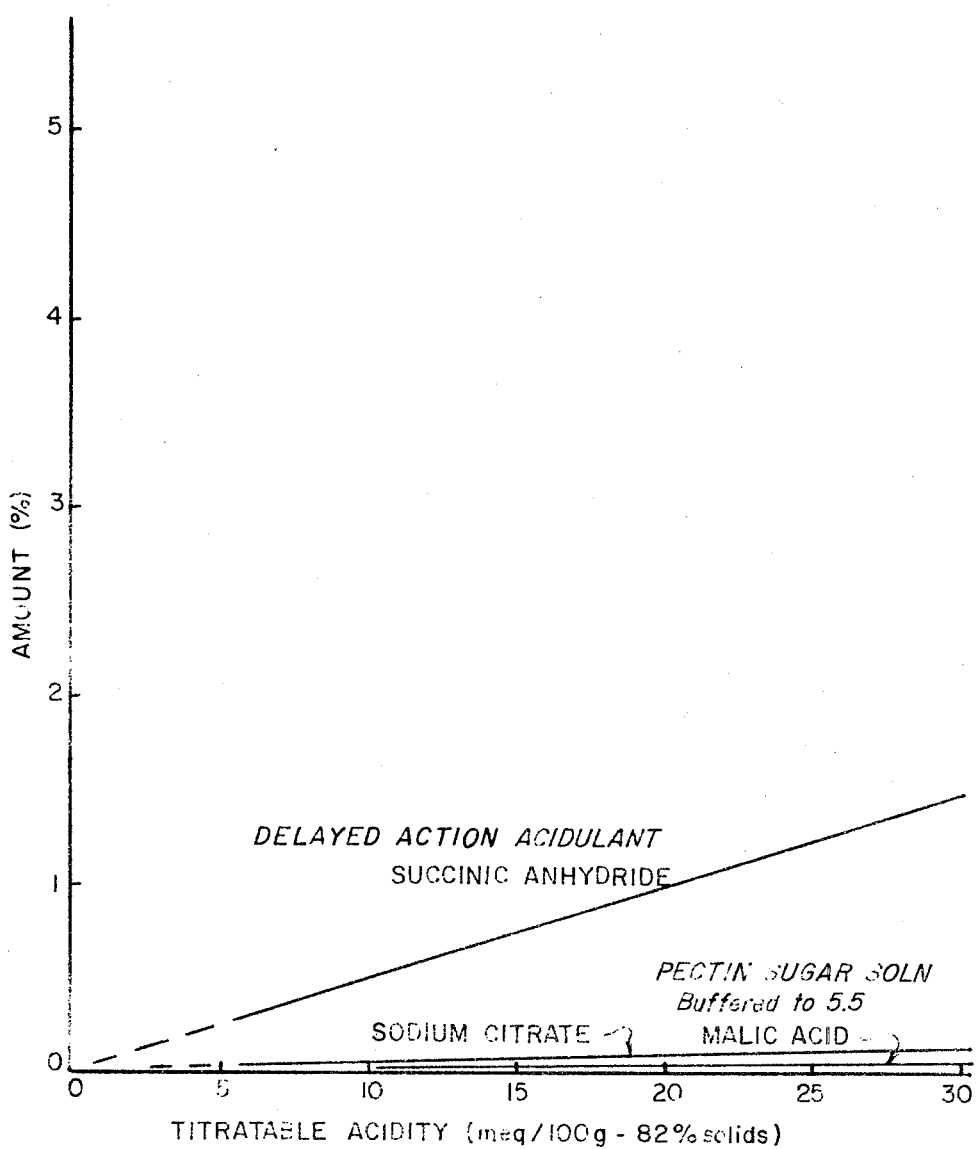

This example deals with the use of succinic anhydride as a delayed-action acidulant according to this invention. The data plotted in FIG. 8 were generated in the manner of the data illustrated in FIGS. 4 and 5. FIG. 8 provides the relative quantities of succinic anhydride needed to prepare a product having a desired titratable acidity and tartness, the amounts of each of the anhydride, the buffer, and the acid being generally less than that needed when GDL is used as the delayed action acidulant, which is generally a reflection of the stronger acidic property of succinic acid compared to gluconic acid.

EXAMPLE 12

This example illustrates the use of the present invention in pectin table spreads normally known as preserves which include jams, jellies, conserves, marmalade, and the like. The gel structure of a spread is much softer than a confection, thus, less pectin is required. Another distinguishing feature is that it must contain fruit juice or fruit pulp to meet the regulatory agency standard of identity, which permits low solids so that typical preserves are in the 68 to 72% solids range. At this solids level, the gel formation is slow, and most preserves do not need the gel delay feature of this invention. However, there are special cases where a preserve of higher solids level is required. One situation where a delayed set would be helpful is in preparing jams using rapid set pectin. The higher viscosity of the rapid set pectin prevents fruit from floating. If the batch is to be filled over a length of time, gelation may start before it is all filled.

Another application is the preparation of preserves to be used with peanut butter is copackaged products to reduce moisture migration from the higher moisture content table spread into the peanut butter. The best way of accomplishing this is by reducing the water in the preserve, which can be facilitated by using a delayed-action acidulant in the lower moisture formulation. The following formula is illustrative of a procedure which will produce such a preserve.

Blend together:
Grape puree concentrate (about 60% solids): 820 g
Invert syrup or high fructose corn syrup (76%): 1315 g
Pectin (slow set, 150 grade): 10 g
Boil to 232° F. to reach a solids of 83 to 85% based on the weight of the total formulation.

While pumping the batch to the filling machine, GDL is metered in at the rate of 6 g/1000 g of preserve. The GDL must be kept dry so the metering must be done with a solids feeder or with a vibra screw at an open place or surge tank in the line. After this addition, the preserve is swirled in a fluid condition with the peanut butter while being filled into the receptical. The set will take place in the jar producing a clear preserve of desireable texture.

EXAMPLE 13

Rapid set pectins are traditionally not recommended for uses in pectin gel products discussed herein since their gels form too rapidly to give sufficient open time to process the batch. These gels also form at a higher pH than those of slow set pectins. These problems can be circumvented according to the present invention, as is illustrated by this example. Two samples were prepared with rapid set high methoxyl pectin (69 to 73 DM) according to the procedure given in Example 1. The parameters of the samples and the results are given in Table V.

TABLE V

| Sample | Z | Z' |
|---|---|---|
| Pectin: (grams) | 4.0 | 3.0 |
| (% of Sugar) | 1.74 | 1.30 |
| Sodium Citrate (grams) | .4 | 0 |
| Malic Acid (grams) | .3 | 0 |
| Post-Boiling Acidulant | Malic | GDL |
| (grams) | 1.5 | 4.5 |
| pH | 3.3 | 3.1 |
| Solids (wt. %) | 83 | 84 |
| Open Time (Minutes) | 0 | 20.9 |
| Gel Strength | 429 | 419 |

These data indicate that the slow acid release method provides ample open time for processing. It also shows that the gel strengths are equivalent even though the slow release procedure had 25% less pectin than the traditional method.

Another formulation according to this invention using "rapid set" high methoxyl pectin can be prepared from a buffered pectin sugar solution having an initial pH of 5.5, 0.89 weight percent (0.19 M) sodium citrate, and 0.15 weight percent (0.44 M) citric acid. To this can be added 2.97 weight percent (0.94 M) GDL to achieve a final pH of 3.6, a calculated titratable acidity of 15 meq/100 g, and a finished moisture content of about 18 weight percent. It is noted that the amount of GDL used under these conditions is 20% less than found to be necessary for achieving a similar titratable acidity with the "slow set" formulations shown in Example 5. This example illustrates that it is possible to use a "rapid set" high methoxyl pectin in a pectin gel confectionary product, when one proceeds according to this invention, which avoids premature gelation due to the relatively high pH setting values of between about 3.0 and 3.8 exhibited by the "rapid set" pectins.

The preceding examples are offered to illustrate the present invention; these examples are not intended to limit the general scope of this invention in strict accordance therewith, but the invention is to be construed and limited only by the scope of the appended claims, including equivalents of the literal wording thereof.

I claim:

1. In a gelled pectin confectionery jellie product prepared from a pre-gelled formulation wherein said formulation includes an aqueous, sugar-containing component, a pectin, and sufficient acidulant to cause said pectin to set said pre-gelled formulation into the gelled product, the improvement comprising: a delayed-action acidulant which gradually introduces hydrogen ions into said formulation over a period of time sufficient to permit deposition of the formulation into a molding container in said pre-gelled state and to bring about in-situ setting of the formulation to said gelled state in said molding container, the pectin confectionery jellie has a sugar solids content above about 76 weight percent, based on the total weight of the product, said pectin is of the high methoxy type with a degree of methylation no lower than about 45 DM, the formulation contains between about 0.5 and about 3 weight percent of said pectin, based on the total weight of the sugar, the formulation contains between about 1 and about 5 weight percent of glucono-deltalactone delayed-action acidulant, based on the total weight of the sugar, said pre-gelled state has an initial pH of between about 3.8 and about 5.5, and said gelled state has a pH approximately the same as an optimum gelation pH for said pectin.

2. The product of claim 1, wherein said sugar is saccharide material selected from the group consisting of sucrose, corn syrup, sorbitol, xylitol, mannitol, and combinations thereof.

3. The product of claim 1, wherein said pectin added to the formulation is of the slow set, high methoxyl type having an average of about 7 to about 10 methoxy groups per molecule 4. The product of claim 1, wherein the pectin is present in an amount as low as about 1 weight percent, based upon the total weight of sugar.

5. The product of claim 1, wherein said period of time is at least about 5 minutes.

6. The product of claim 1, wherein said pectin is a slow set, high methoxyl pectin, and said optimum pH is between about 2.7 and 3.3.

7. The product of claim 1, wherein said pectin is a rapid set, high methoxyl pectin, and said optimum pH is between about 3.2 and 3.8.

8. In a pectin gelled product gel set within a container, said product prepared from a pre-gelled gormulation wherein said formulation contains an aqueous, sugar-containing syrup, a pectin, and sufficient acidulant to cause said pectin to gel said pre-gelled formulation in the container, the improvement comprising: a delayed-action acidulant which hydrolyzes over a length of time sufficient to provide an open time to facilitate deposition of the pre-gelled formulation into the container, said open time is sufficient to permit said pre-gelled state deposition and in-situ setting to a gelled state within the container, the pectin gelled product has a sugar solids content above about 76 weight percent, based on the total weight of the product, said pectin is of the high methoxy type with a degree of methylation no lower than about 45 DM, the formulation contains between about 0.5 and about 3 weight percent of said pectin, based on the total weight of the sugar, the formulation contains between about 1 and about 5 weight percent of glucono-delta-lactone delayed-action acidulant, based on the total weight of the sugar, said pre-gelled state has an initial pH of between about 3.8 and about 5.5, and said gelled state has a pH approximately the same as an optimum gelation pH for said pectin.

9. The pectin gelled product of claim 8, wherein said delayed-action acidulant hydrolyzes to provide enough hydrogen ions to said formulation to effect said gelled state, and said open time is at least about 5 minutes.

10. The pectin gelled product of claim 8, wherein said product is a pectin confectionery jellie having a moisture content between about 15 and 24 weight percent, based upon the total weight of the product having a gel strength above 250 grams.

11. The pectin gelled product of claim 8, wherein said product is a table spread, having a moisture level less than about 20 weight percent, and said table spread is prepackaged in layers with another spread having a moisture content lower than about 20 weight percent.

12. A method for preparing a gelled product, comprising:
selecting a high methoxy type pectin that has a degree of methylation no lower than about 45 DM and an optimum gelation pH;
preparing a pectin blend including an aqueous, sugar-containing component and between about 0.5 and about 3 weight percent of said pectin, based on the total weight of the sugar, said pectin gel blend having an initial pH of between about 3.8 and about 5.5, said initial pH being greater than said optimum gelation pH;
adding between about 1 and about 5 weight percent of glucono-delta-lactone, based on the total weight of the sugar, to said pectin gel blend to form a delayed-action blend;
filling the delayed-action blend into a molding container; and
permitting the delayed-action acidulant of the thus filled delayed-action blend to be reduced in pH value to a level substantially the same as said optimum gelation pH for gel setting said delayed-action blend within the molding container to a gelled product having a sugar solids content above about 76 weight percent, based on the total weight of the product.

13. The method of claim 12, wherein said gel setting step takes place within at least about 5 minutes after said step of adding the delayed-action acidulant.

14. The method of claim 12, wherein said pectin is a slow set, high methoxyl pectin, said optimum pH is between about 2.7 and about 3.3, and said initial pH is between about 3.8 and about 4.8.

15. The method of claim 12, wherein said pectin is a rapid set, high methoxyl pectin, said optimum pH is between about 3.2 and about 3.7, and said initial pH is between about 4.5 and about 5.5.

16. A pectin gelled product produced according to the method of claim 12.

* * * * *

UNITED STATES PATENT AND TRADEMARK OFFICE
CERTIFICATE OF CORRECTION

PATENT NO. : 4,241,099
DATED : December 23, 1980
INVENTOR(S) : Peter J. Tiemstra It is certified that error appears in the above-identified patent and that said Letters Patent are hereby corrected as shown below:

delta-lactone--.
Column 1, line 50, "sybstituted" should read --substituted--.
Column 3, line 8, "includes" should read --include--.
Column 3, line 32, "mishapened" should read --misshapened--.

Column 4, line 5, "in situ" should be underlined.
Column 4, line 37, "have a" should read --having a--.
Column 5, line 52, "gluconodelta" should be --glucono-delta--.
Column 6, line 15, "3.9" should read --3.8--.
Column 6, line 27, "adid" should read --acid--.
Column 6, line 61, "have" should read --having--.
Column 13, line 33, Table III, "meg" should read --meq--.
Column 13, line 35, Table III, "meg/1-0g" should read --meq/100g--.

Signed and Sealed this

Seventh Day of July 1981

[SEAL]

Attest:

RENE D. TEGTMEYER

Attesting Officer    Acting Commissioner of Patents and Trademarks